US007746300B2

(12) United States Patent
Zhang et al.

(10) Patent No.: US 7,746,300 B2
(45) Date of Patent: Jun. 29, 2010

(54) CIRCUIT AND METHODOLOGY FOR SUPPLYING PULSED CURRENT TO A LOAD, SUCH AS A LIGHT EMITTING DIODE

(75) Inventors: Bin Zhang, Apex, NC (US); Bryan A. Legates, Sunnyvale, CA (US); Eric S. Young, Apex, NC (US)

(73) Assignee: Linear Technology Corporation, Milpitas, CA (US)

( * ) Notice: Subject to any disclaimer, the term of this patent is extended or adjusted under 35 U.S.C. 154(b) by 1090 days.

(21) Appl. No.: 11/418,131

(22) Filed: May 5, 2006

(65) Prior Publication Data

US 2007/0257861 A1 Nov. 8, 2007

(51) Int. Cl.

| | |
|---|---|
| ***G09G 3/32*** | (2006.01) |
| ***G09G 5/00*** | (2006.01) |
| ***G06F 3/038*** | (2006.01) |
| ***G05F 1/00*** | (2006.01) |
| ***G05F 1/24*** | (2006.01) |
| ***H05B 37/02*** | (2006.01) |
| ***H05B 39/04*** | (2006.01) |
| ***H05B 41/36*** | (2006.01) |

(52) U.S. Cl. ......................... 345/82; 345/211; 345/212; 345/204; 315/291; 315/307; 323/344

(58) Field of Classification Search ................. 323/222, 323/223, 344, 271; 315/291, 307; 345/46, 345/48, 690, 211, 212, 214, 204

See application file for complete search history.

(56) References Cited

U.S. PATENT DOCUMENTS 5,519,288 A 5/1996 Tatsumi et al.

(Continued)

FOREIGN PATENT DOCUMENTS

WO WO 2004100614 A1 * 11/2004

(Continued)

OTHER PUBLICATIONS

International Preliminary Report on Patentability and Written Opinion of the International Searching Authority, issued in International Patent Application No. PCT/US2007/010442, mailed on Jan. 11, 2008.

(Continued)

*Primary Examiner*—Bipin Shalwala
*Assistant Examiner*—Ilana Spar
(74) *Attorney, Agent, or Firm*—McDermott Will & Emery LLP

(57) ABSTRACT

A circuit for controlling pulsed current to a load, one application of which is in LED dimmer circuitry, comprises first and second reference nodes for receiving a supply voltage, an input node for receiving a timing signal such as a PWM signal, and a controlled switch coupled between the first and second reference voltage nodes for supplying current to the load. Pull-up circuitry may be coupled between a control electrode of the controlled switch and first reference voltage node, and a pull-down switch coupled between the control electrode and second reference voltage node. A control circuit coupled between the input node and control electrode of the controlled switch is configured to control the controlled switch in response to the timing signal. The circuit may further include a reference voltage source configured for producing a voltage of magnitude independent of supply voltage magnitude. The control circuit is coupled to the reference voltage source and operative to control the controlled switch in response to the timing signal and reference voltage.

35 Claims, 5 Drawing Sheets

U.S. PATENT DOCUMENTS

| | | | | |
|---|---|---|---|---|
| 6,011,382 | A | 1/2000 | Littlefield et al. | |
| 7,115,888 | B2 * | 10/2006 | Hachiya et al. | 250/552 |
| 2006/0007111 | A1 * | 1/2006 | Moon et al. | 345/102 |

FOREIGN PATENT DOCUMENTS

| | | | |
|---|---|---|---|
| WO | WO 2007/088505 | A1 | 8/2007 |

OTHER PUBLICATIONS

Chinese Notification of the First Office Action (in English) issued in Chinese Patent Application No. 2007800162678, dated Jan. 15, 2010.

* cited by examiner

CIRCUIT AND METHODOLOGY FOR SUPPLYING PULSED CURRENT TO A LOAD, SUCH AS A LIGHT EMITTING DIODE

FIELD OF THE INVENTION

The subject matter of this disclosure relates to controlling supply of pulsed current to a load, one application of which is in light emitting diode dimmer circuits.

BACKGROUND

Loads of various types can be driven by a pulsed current source, in which the width, or duty ratio, of pulses controls the amount of current supplied to the load. An example is in a circuit for driving a light emitting diode (LED) with a pulsed current source, in which the pulse width is varied in order to control light intensity produced by the LED. Pulsed current is generated from an unregulated input voltage supply by enabling and disabling a voltage regulator to drive the desired current through the LED. If the pulse is mainly on (high duty ratio), LED light intensity is high. As duty ratio is lowered, the LED will appear to dim.

A variety of regulator topologies has been implemented to generate pulsed current of varying duty ratio, namely Buck, Boost, and Buck-Boost converters, each of which employs an inductor and filter capacitor to generate regulated voltage. FIG. 1 shows a switching regulator 10 in the Buck configuration driving an LED load 12, which may comprise a single LED or a network of LEDs in series, parallel or series-parallel configuration. A series pair of LEDs is depicted in FIG. 1 by way of example. Converter 10 comprises a bipolar transistor 12, Schottky diode 14, inductor 22, capacitor 23 and resistor 16, connected as shown. Connected across resistor 16 through which a current $I_{LED}$ flows to activate the LED load 12, is an amplifier 18. The inverting input of amplifier 18 is connected to unregulated input voltage source $V_{IN}$ at node 14 through a fixed reference voltage source 20 of magnitude $V_{REF}$ and of polarity shown. Amplifier 18 accordingly generates a signal that indicates when the voltage drop across current sense resistor 16 exceeds the level of reference voltage $V_{REF}$ source 20. Coupled to the output of amplifier 18 is an on/off modulator 17, cycled by an input pulse width modulation (PWM) signal applied at node 24.

As the operation of a Buck type switching regulator is well known, the same will not be described herein, for brevity.

The conventional regulator 10 of type depicted in FIG. 1 has inherent deficiencies, making it poorly suited to precision applications such as in PWM dimming of driven LEDs. For example, the FIG. 1 switching regulator tends to maintain voltage across the LED load after the regulator turns off. An unregulated current accordingly continues to flow through LED 12 for some time period after turn-off, until capacitor 23 discharges. In addition, restoration of load current is delayed by the amount of time it takes to recharge capacitor 23 once the regulator is re-enabled. This characteristic is unacceptable in precision LED dimming circuits, where accurate control of LED intensity may be important to maintain constant LED color over a wide range of brightness. As DC current through an LED changes, so does the color of light the LED emits. For example, a blue LED will still be generally blue whether it is driven at 100 mA or 1 mA, but the wavelength of light emitted from it will change significantly. It is important to applications in which red/green/blue LEDs are mixed, for example, to achieve a desired white light, to accurately control LED emission.

To confront capacitor charging and discharging delay in the conventional regulator, PWM dimming has been improved by introducing a switch in series with the LED load, to interrupt current flow through the LED during times when the regulator is turned off. This technique employs either an NMOS (N-channel metal oxide semiconductor field effect transistor) switch to disconnect the load from the low voltage side (e.g., ground side) of the output voltage (termed low side LED dimming) or a PMOS (P-channel metal oxide semiconductor field effect transistor) switch on the high side (e.g., power side) to disconnect the LED load from the high voltage side of the output voltage (high side LED dimming). Either technique interrupts the discharge path of the regulator capacitor.

In the example of a low side LED dimmer circuit, the NMOS switch can be driven with the same signal as the PWM signal that enables the regulator. However, a high side LED dimmer implements a PMOS switch that must be driven with an inverted version of the PWM signal that is level shifted to the PMOS source voltage.

The low side dimming approach can be employed to extend PWM dimming ratio for the Buck converter shown in FIG. 1. A low side dimming circuit 30 and part of the Buck converter are shown in FIG. 2. The PWM dimming ratio is improved by connecting a NMOS transistor 34 in series with LED load 32. The gate of transistor 34 is switched by the PWM signal applied to an NMOS transistor 36, connected between transistor 34 and ground. A resistor divider consisting of resistors 40 and 42, connected as shown, establishes operating voltage levels for the circuit.

Although an improvement over the conventional circuit, the low side PWM dimming circuit of FIG. 2 has shortcomings. The values of resistors 40 and 42 are difficult to establish, gas magnitudes of $V_{IN}$ and $V_{OUT}$ with respect to ground must be known precisely for establishing the appropriate resistance values needed in order to turn off NMOS switch 34 when the PWM signal is high. When PWM is low, NMOS transistor switch 36 turns off, and switch 34 is turned on by resistor 40. If $V_{IN}$-$V_{OUT}$ is too high, an additional circuit must be recruited to prevent over-voltage from destroying the gate of the NMOS switch 34. For this reason, a high side PWM dimmer circuit of the type shown in FIG. 3 often is preferred.

Referring to FIG. 3, high-side LED dimmer circuit 40 implements an NMOS transistor 46 to ground and resistor divider 42,54 to perform inversion and voltage level shifting to enable PMOS switch 44 to be cycled in response to a PWM signal applied at node 48. The resistor divider 42,54 is necessary to limit the voltage between source and gate electrodes of PMOS switch 44, required when source voltage exceeds 20 volts above ground. This method of driving the PMOS gate, however, has several disadvantages. Resistor divider 42,54 imposes an RC time constant on the switch turn-on and turn-off times. The resistor divider ratio generally is fixed, with the undesirable result that the gate to source voltage applied to switch 44 is proportional to the supply voltage at $V_{IN}$, which is unregulated and, hence, variable. In addition, the resistor divider 42,54 draws substantial current from the power supply during the time when the PMOS transistor 44 is turned on. The present disclosure describes an improved circuit that addresses the aforementioned deficiencies.

SUMMARY

One aspect of the disclosed subject matter is in a circuit for controlling pulsed current applied to a load, comprising an input node for receiving a timing signal such as a PWM signal, a switch having first and second electrodes and a control electrode, coupled between a high side voltage node and the load, and a source of reference voltage having a magnitude independent of supply voltage magnitude. A control circuit is configured for shifting the level of the PWM signal to cause the PWM signal to vary between a voltage of the first electrode of the switch and a prescribed fixed voltage, related to the reference voltage below that of the first electrode voltage. A drive circuit is responsive to an output of the control circuit for driving the control electrode of the switch.

Another aspect is a circuit for controlling light intensity of an LED, comprising first and second reference nodes for receiving a supply voltage, an input node for receiving a timing signal, such as a PWM signal, and a controlled switch coupled between the first reference voltage node and the LED for supplying current to the LED. The controlled switch has a control electrode for controlling on and off states of the controlled switch. Pull-up circuitry is coupled between the control electrode and first reference voltage node, and a pull-down switch is coupled between the control electrode and second reference voltage node. A source of reference voltage is provided which has a magnitude independent of supply voltage magnitude. A control circuit coupled between the input node and control electrode of the controlled switch is configured for shifting the level of the PWM signal to cause the control electrode to vary in voltage between a voltage of the first electrode of the switch and a prescribed fixed voltage, related to the reference voltage, below that of the first electrode voltage.

Still another aspect of the disclosed subject matter is in a circuit for supplying pulsed current to a load, comprising first and second reference nodes for receiving a supply voltage, an input node for receiving a timing signal, such as a PWM signal, and a controlled switch coupled between the first reference voltage node and the load, the controlled switch having first and second electrodes and a control electrode for controlling on and off states of the controlled switch. Pull-up circuitry is coupled between the control electrode and first reference voltage node, and a pull-down switch is coupled between the control electrode and second reference voltage node. A source of reference voltage is included which has a magnitude independent of supply voltage magnitude; and a feedback circuit is configured to drive the control electrode of the controlled switch in response to the PWM signal and reference voltage source.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

DETAILED DESCRIPTION

Figure 1:
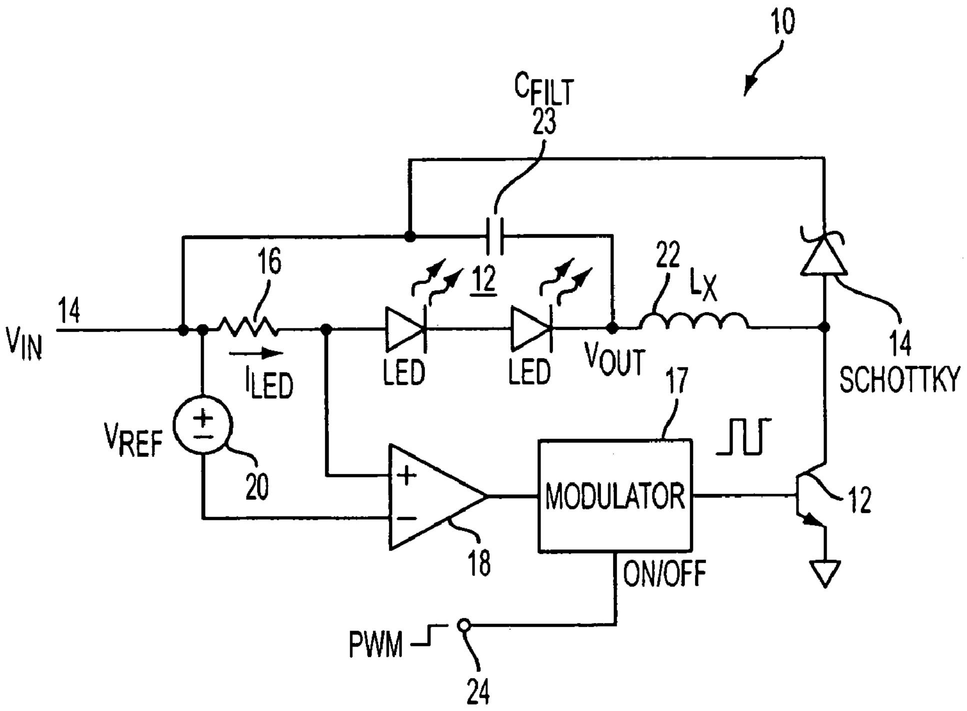
FIG. 1 PRIOR ART
FIG. 1 is a circuit diagram of a buck type switched converter, implemented as an LED dimmer circuit.
Figure 2:
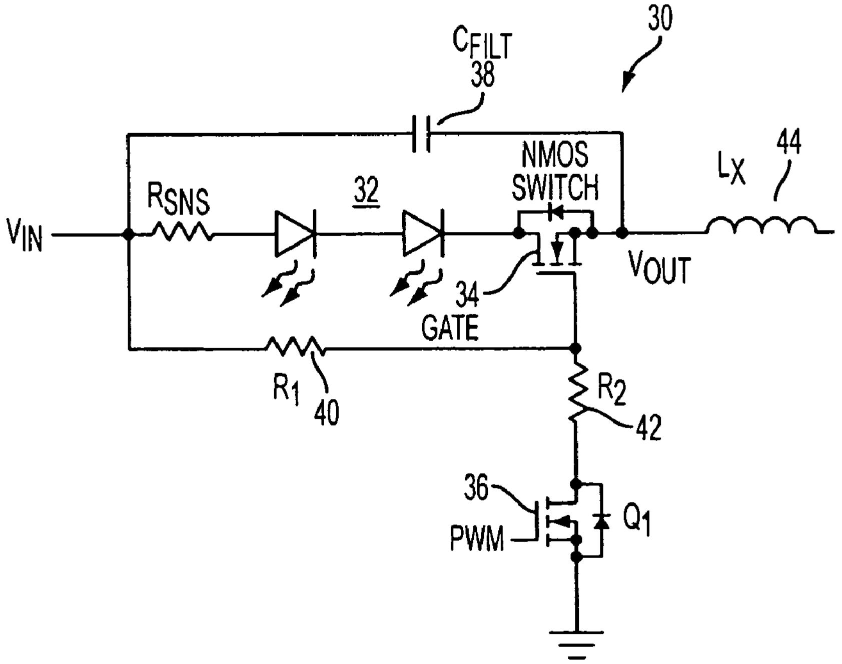
FIG. 2 is a circuit showing an improvement, implemented in the prior art, in which a low side disconnect switch is used for PWM dimming.
Figure 3:
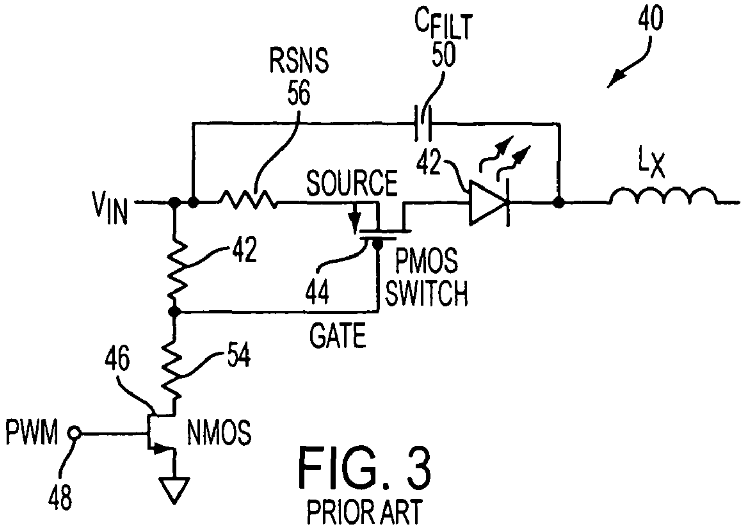
FIG. 3 PRIOR ART
FIG. 3 shows a circuit diagram of a high side disconnect switch of the prior art, for LED dimming.
Figure 4:
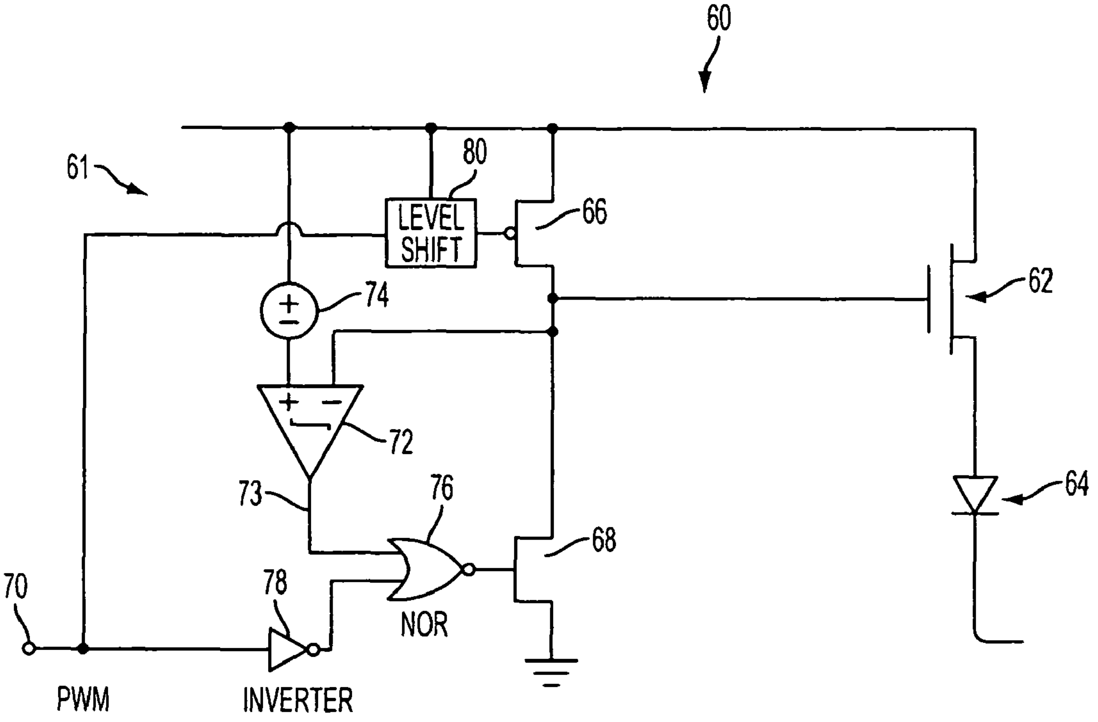
FIG. 4 is a diagram showing an improved high side disconnect switch, in accord with the teachings herein, presented in simplified form.

Referring to FIG. 4, a circuit for controlling pulsed current applied to a load, in this example an LED dimmer circuit 60, constructed in accord with the current teachings, implements a novel high side disconnect switch driver 61 for driving PMOS switch 62 so as to apply current pulses of precisely controlled width to LED load 64. Disconnect switch driver 61 comprises a pull-up switch 66 connected between the source and gate of PMOS switch 62, and a pull-down switch 68 between the gate and ground. Switches 66 and 68, depicted symbolically, are complementary devices which may be bipolar or MOS transistors or other switchable devices, or functional circuits. Voltage between the gate and source of PMOS switch 62 is monitored by a comparator 72 through a reference voltage source 74 of polarity shown connected between the source of the PMOS switch and the positive input of the comparator. The negative input of comparator 72 is connected to the gate of PMOS switch 62. Accordingly, the output state of comparator 72, at line 73, switches state when the gate-to-source voltage of PMOS switch 62 is higher than the voltage across the reference source 74, independently of the positive supply voltage at the source of PMOS switch 62.

The output of comparator 72 is supplied to one input of a logic NOR gate 76, the output of which is connected to the control input of pull-down switch 68. To the other input of NOR gate 76 is applied the PWM signal at line 73.

The control gate of pull-up switch 66 receives a level-shifted replica of the PWM signal, through a level shift circuit 80, altered somewhat in magnitude. Circuit operation is as follows.

Figure 5A:
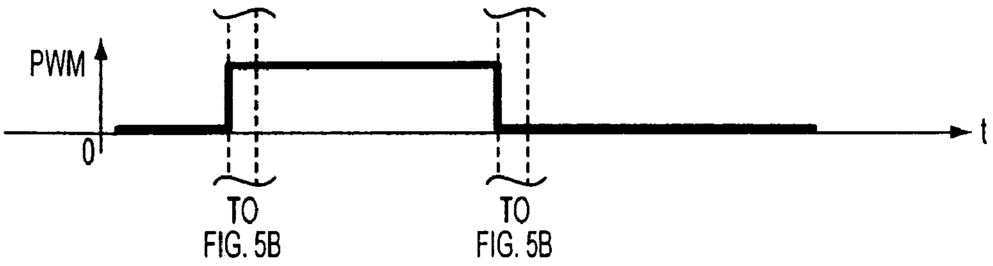
FIGS. 5*a*-5*c* are waveforms generated in the circuit of FIG. 4.

When PWM is low (t<t1 in FIG. 5*a*), one input of NOR gate 76 is high, through inversion of PWM to PWMB by inverter 78, and the output of that gate is held low. Pull-down switch 68 accordingly is off, and the level of the negative input of comparator 72 is high. The voltage "GATE" at the gate of PMOS switch 62 is high, FIG. 5*c*, being at the level of the source of that switch through pull-up switch 66 which is turned on by PWM through level shift 80. The output of comparator 72 will be low. Pull-down switch 68 is maintained off because the output of inverter 78 is high, and the output of gate 76 is low.

When PWM transitions high (at time t1 in FIG. 5*a*), the output of inverter 78 becomes low, pull-down switch 68 turns on because the output of comparator 72 and hence of NOR gate 76 are low, and at the same time level shift circuit 80 transmits a high signal to switch 66, turning switch 66 off. At this time, as the voltage level on line 73 is low, line 73 does not inhibit switch 68 from turning on.

The voltage GATE applied to the gate of PMOS transistor 62 will decrease until (at t=t2) either the gate voltage is equal to ground (if the magnitude of reference source 74 is below ground) or until the gate voltage drops to be lower than the reference voltage, detected by comparator 72, FIG. 5*c*.

If the reference voltage at line 73 is above ground, the GATE voltage at PMOS transistor 62 will be maintained slightly below the reference voltage. When the GATE voltage falls below the reference voltage level, see FIG. 5*c*, which is floating, the voltage level of line 73 at the output of comparator 72 will become high, causing pull-down switch 68 to turn off through the action of NOR gate 76. When PWM next transitions low (t=t3), pull-down switch 68 will be disabled through the other input of NOR gate 76, and pull-up switch 66 will be enabled through the level shift circuit 80. The voltage GATE on the gate of PMOS transistor 62 will now increase, (see t=t4 in FIG. 5*c*) until the gate voltage GATE equals the source voltage of that transistor, and will remain at that level while PWM is low. The voltage on line 73 will transition to a low value, to set up for the next positive transition of PWM.

It is significant to note that the circuit of FIG. 4 has much smaller RC constant delays than occurs in the conventional circuit, because the resistors have been replaced by switches. Current flow through the pull-up and pull-down switches 66 and 68 is substantial, contributing to fast switching and minimum power dissipation. Very small power is dissipated to maintain the state of comparator when the circuit is in a static state. Power dissipation in the described circuit is greatly reduced compared to that of the convention circuit, because there is no resistor divider. Furthermore, as reference voltage source 74 is fixed in magnitude, and independent of other voltages in the circuit when the reference voltage is higher than ground, the PMOS gate-to-source drive voltage is independent of supply or input voltage.

Figure 6:
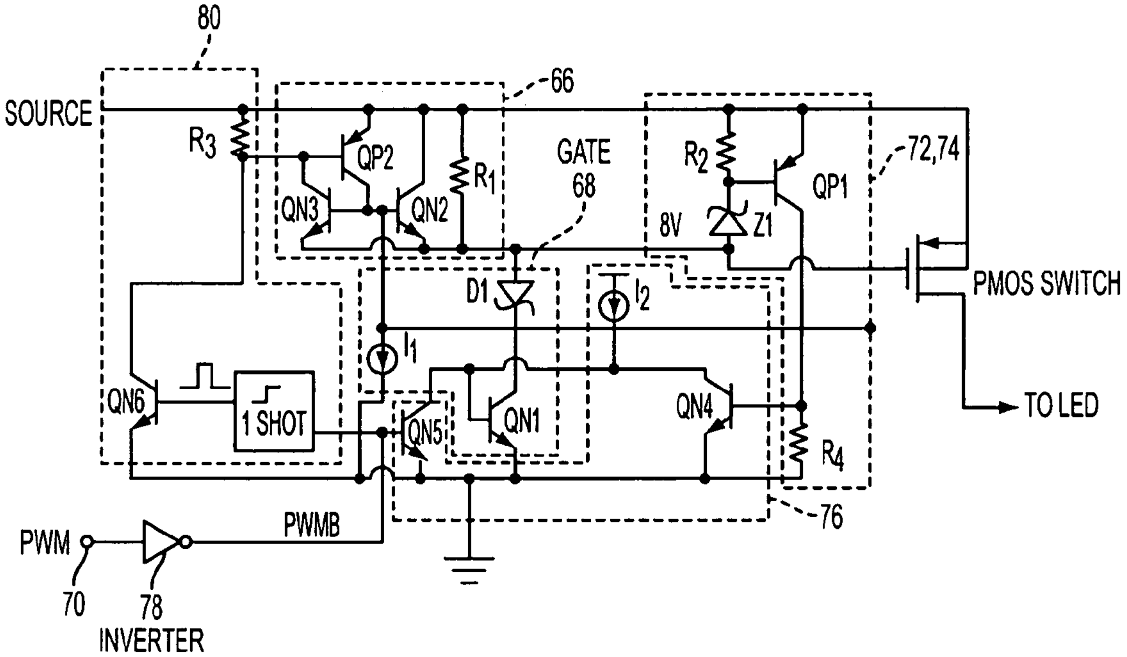
FIG. 6 is a detailed circuit diagram for corresponding to FIG. 4.

FIG. 6 is a more detailed circuit diagram corresponding to FIG. 4. As presented, pull-down switch 68 is implemented by bipolar transistor QN1, a current source I1 and diode D1. Pull-up switch 66, a latch circuit, is implemented by bipolar transistors QP2, QN2 and QN3, in addition to resistor R1.

Level shift circuit 80 is comprised of a one shot circuit, transistor QN6 and resistor R3, as depicted. The one shot circuit is a mono-stable multi-vibrator that produces a short duration output pulse in response to an input voltage change produced by the PWM signal at node 70 through inverter 78.

NOR gate 76 in FIG. 4 is implemented in FIG. 6 by transistors QN5, QN4 and current source I2. Comparator 72 and reference 74, together forming a PMOS 62 gate-to-source voltage limit detect circuit, are implemented in FIG. 6 by Zener diode Z1, resistor R2, transistor QP1 and resistor R4, connected as shown.

In operation, when the PWM signal at node 70 transitions high, pull-down switch QN1 is activated because QN5 turns off and base current flows into transistor QN1. Transistor QN1 sinks current from the gate of PMOS transistor 62 through diode D1. Pull-up latch or switch 66 is inactive at this time because there is no current driving resistor R3, and diode D1 ensures that transistors QN2 and QN3 are turned off. Transistor QN1 continues to sink a large amount of current from the gate of PMOS transistor 62 until Zener diode Z1 in the limit detect circuit, between the gate and source of the PMOS transistor, begins to conduct current (at 8 volts in practice). The current flowing through Zener diode Z1 turns on current source QP1, which supplies current to transistor QN4 and resistor R4, that in turn turns off base drive to turn off transistor QN1. Current from current source I1 sinks a small amount of current from the gate of PMOS transistor 62 to maintain the on state voltage, and maintain the limit detect circuit 72,74 activated. With the limit detect circuit 72, 74 active, transistor QN1 turns off.

When the PWM signal transitions low, pull-down transistor QN1 is maintained off, and current source I1 disabled. The PWMB signal next will transition high, generating a one-shot pulse, which activates the pull-up latch or switch, consisting of transistors QN2, QN3 and QP2. This latch will now source a large current until the gate and source voltages of PMOS transistor 62 equalize, and will turn off. Pull-up resistor R1 maintains the gate of PMOS switch 62 at the transistor source potential.

Figure 7:
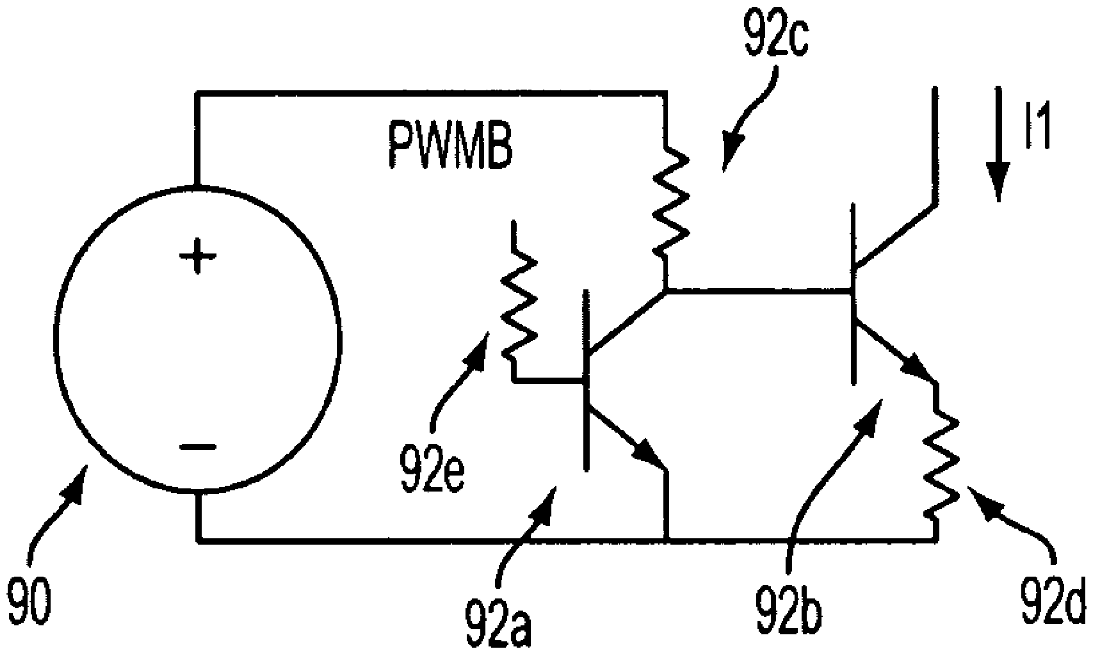
FIG. 7 is a circuit diagram showing a configuration of controlled current source of a type implemented in FIG. 6.
Figure 5A:
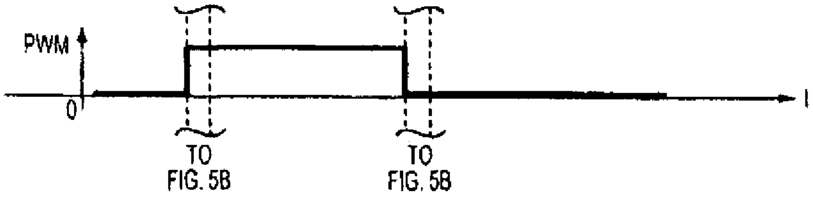
Figure 5B:
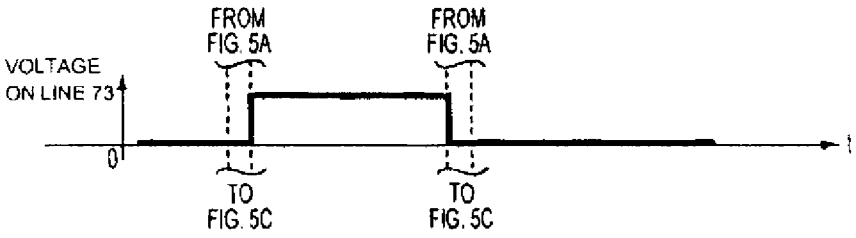
Figure 5C:
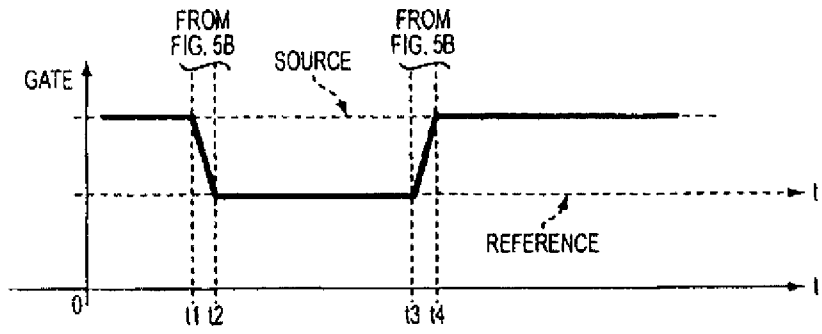
Figure 6:
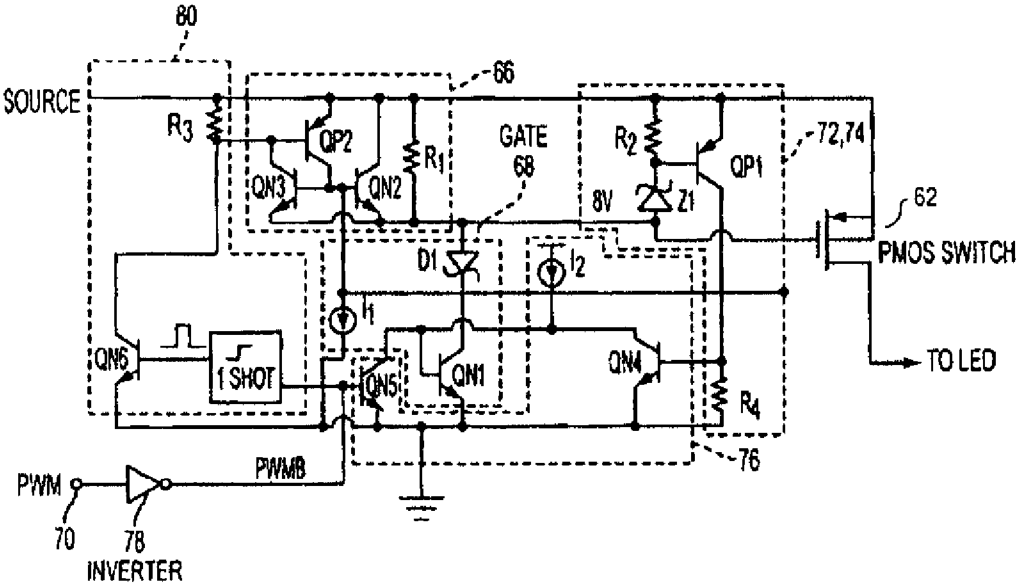

Current source I1 is a controlled source, operating as described. One configuration of this type of current source is shown in the circuit diagram of FIG. 7, in which a constant voltage source 90 is buffered through controlled buffer circuit 92 consisting of transistors 92A, 92B, and resistor 92C, 92D, connected as shown. Thus, when PWMB is low, the buffer 92 is turned on, causing current I1 to conduct through transistor 92B. When PWMB is high, the buffer 92 is off.

The reference and comparator circuits 74, 72 in FIG. 4 are combined in FIG. 6, in the form of Zener diode Z1, resistors R2 and R4 and transistor QP1, as explained previously, to detect a gate-to-source voltage limit of PMOS 62. When the gate voltage at PMOS transistor 62 drops to about 8.7 volts less than that of the source, Zener diode Z2 breaks down and pulls current out the base of transistor QP1. Transistor QP1 now is turned on, and current flowing out of the collector of transistor QP1 is injected into the base of transistor QN4, forming one of the inputs of the NOR gate.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. For example, although circuit implementation is described in relation to a power supply of prescribed polarity, and exemplary diode and transistor types and polarities shown, other circuit configurations may be implemented. It is intended by the following claims to claim any and all applications, modifications and variations that fall within the true scope of the present teachings.

What is claimed is:

1. A circuit for controlling pulsed current applied to a load, comprising:
- an input node for receiving a timing signal;
- a switch having first and second electrodes and a control electrode, the first electrode being coupled to a high side voltage node and the second electrode being coupled to the load;
- a source of reference voltage having a magnitude independent of supply voltage magnitude;
- a control circuit, responsive to the timing signal, for varying a voltage of the control electrode of the switch between a voltage of the first electrode of the switch and a prescribed fixed voltage related in magnitude to the reference voltage below that of the first electrode voltage; and
- a drive circuit, responsive to an output of the control circuit, for driving the control electrode of the switch.

2. The circuit as recited in claim 1, wherein the control circuit is configured for shifting the level of the timing signal.

3. The circuit as recited in claim 1, wherein the switch is a PMOS transistor.

4. The circuit as recited in claim 1, wherein the load is a light emitting diode (LED).

5. A circuit for controlling light intensity of a light emitting diode (LED), comprising:
- first and second reference nodes for receiving a supply voltage;
- an input node for receiving a timing signal;
- a controlled switch coupled between the first reference voltage node and the LED for supplying current to the LED, the controlled switch having a control electrode for controlling on and off states of the controlled switch;
- pull-up circuitry coupled between the control electrode and first reference voltage node;

a pull-down switch coupled between the control electrode and second reference voltage node; and a source of reference voltage that is independent of supply voltage; and a control circuit coupled between the input node and control electrode of the controlled switch for controlling the control electrode to vary in voltage between a voltage of the first electrode of the switch and a prescribed fixed voltage, related to the reference voltage, below that of the first electrode voltage.

6. The circuit as recited in claim 5, wherein the control circuit is configured for shifting the level of the timing signal.

7. The circuit as recited in claim 5, wherein the control circuit compares the control electrode voltage with the reference voltage, and supplies a turn-off signal to the pull down switch when the control electrode voltage is lower than the reference voltage.

8. The circuit as recited in claim 5, wherein the reference voltage source includes one or more voltage reference devices.

9. The circuit as recited in claim 8, wherein the voltage reference devices include at least one Zener diode.

10. The circuit as recited in claim 8, wherein the reference voltage source is coupled between the first reference voltage node and the control electrode through a feedback circuit.

11. The circuit as recited in claim 10, wherein the feedback circuit is configured for detecting the voltage of the controlled electrode and generating a feedback signal if the voltage of the controlled electrode reaches the reference voltage, so as to enable the control circuit to control the voltage of the controlled electrode to be limited by the reference voltage magnitude.

12. The circuit as recited in claim 5, wherein the controlled switch is a PMOS transistor.

13. The circuit as recited in claim 12, wherein the pull-up and pull-down switches include bipolar transistors.

14. A circuit for supplying pulsed current to a load, comprising:

first and second reference nodes for receiving a supply voltage;

an input node for receiving a timing signal;

a controlled switch coupled between the first reference voltage node and the load, the controlled switch having first and second electrodes and a control electrode for controlling on and off states of the controlled switch;

pull-up circuitry coupled between the control electrode and first reference voltage node;

a pull-down switch coupled between the control electrode and second reference voltage node;

a source of reference voltage having a magnitude independent of supply voltage magnitude; and a feedback circuit configured to drive the control electrode of the controlled switch in response to the timing signal and reference voltage source.

15. The circuit as recited in claim 14, wherein the control circuit compares the control electrode voltage with the reference voltage, and supplies a turn-off signal to the pull down switch when the control electrode voltage is lower than the reference voltage.

16. The circuit as recited in claim 15, wherein the reference voltage source is coupled through a comparator to the first electrode and control electrode of the controlled switch.

17. The circuit of claim 16, wherein the comparator has first and second inputs coupled, respectively, through the reference voltage source to the first electrode and control electrode of the controlled switch.

18. The circuit of claim 17, including a logic gate having inputs coupled respectively to the output of the comparator and input node for controlling the pull-down switch.

19. The circuit of claim 18, further including a voltage level shift circuit coupled to the input node for controlling the pull-up circuitry.

20. The circuit of claim 18, wherein the logic gate is a NOR gate, an inverter circuit being coupled between the input node and an input of the NOR gate.

21. The circuit as recited in claim 14, wherein the controlled switch is a PMOS transistor.

22. The circuit as recited in claim 14, wherein the pull-up circuitry and pull-down switch include bipolar transistors.

23. The circuit as recited in claim 14, wherein the pull-up circuitry comprises a pull-up latch including a bipolar transistor having collector and emitter electrodes coupled to source and gate electrodes of the controlled switch.

24. The circuit as recited in claim 14, wherein the pull-down switch comprises a bipolar transistor having collector and emitter electrodes coupled, through a diode, respectively to the gate of the controlled switch and second reference node, and a base electrode coupled to a current source.

25. The circuit as recited in claim 19, wherein the pull-up circuitry comprises a pull-up latch circuit including a bipolar transistor having collector and emitter electrodes coupled to source and gate electrodes of the controlled switch, and the voltage level shift circuit comprises a one shot circuit coupled to the latch.

26. The circuit as recited in claim 23, further including a controlled current source coupled to the pull-down switch and the pull-up latch.

27. The circuit as recited in claim 14, wherein the reference voltage source includes one or more voltage reference devices.

28. The circuit as recited in claim 27, wherein the one or more voltage devices include at least one Zener diode.

29. The circuit as recited in claim 14, including a feedback network, responsive to the voltage of the control electrode, the reference voltage source being coupled between the first electrode and control electrode of the controlled switch through the feedback network.

30. The circuit as recited in claim 29, wherein the control circuit is configured to be responsive to the feedback network to control the control electrode of the controlled switch to vary between a first reference voltage node and a fixed voltage, related to the reference voltage, below that of the first reference voltage node.

31. The circuit as recited in claim 30, wherein the control circuit is configured to supply a turn-off signal the pull down switch when the feedback signal indicates that the voltage of the control node has reached the reference voltage.

32. The circuit as recited in claim 14, wherein the load is a light-emitting diode (LED).

33. The circuit as recited in claim 1, wherein the timing signal is a PWM signal.

34. The circuit as recited in claim 4, wherein the timing signal is a PWM signal.

35. The circuit as recited in claim 14, wherein the timing signal is a PWM signal.

* * * * *

UNITED STATES PATENT AND TRADEMARK OFFICE

CERTIFICATE OF CORRECTION

PATENT NO. : 7,746,300 B2
APPLICATION NO. : 11/418131
DATED : June 29, 2010
INVENTOR(S) : Bin Zhang et al.

It is certified that error appears in the above-identified patent and that said Letters Patent is hereby corrected as shown below:

In the Drawings

Figure 5B:
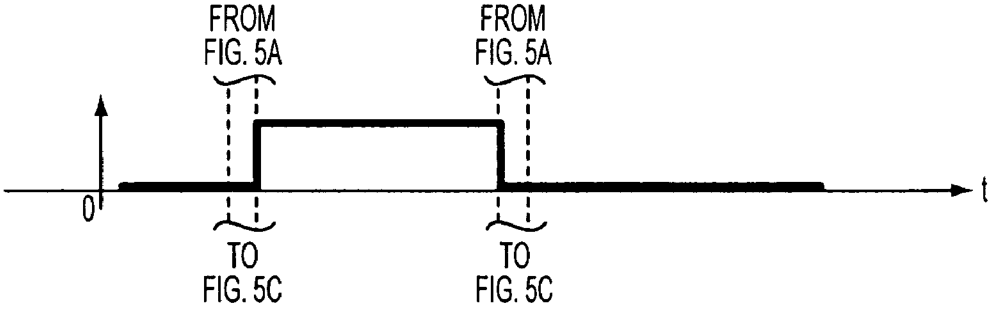
Figure 5C:
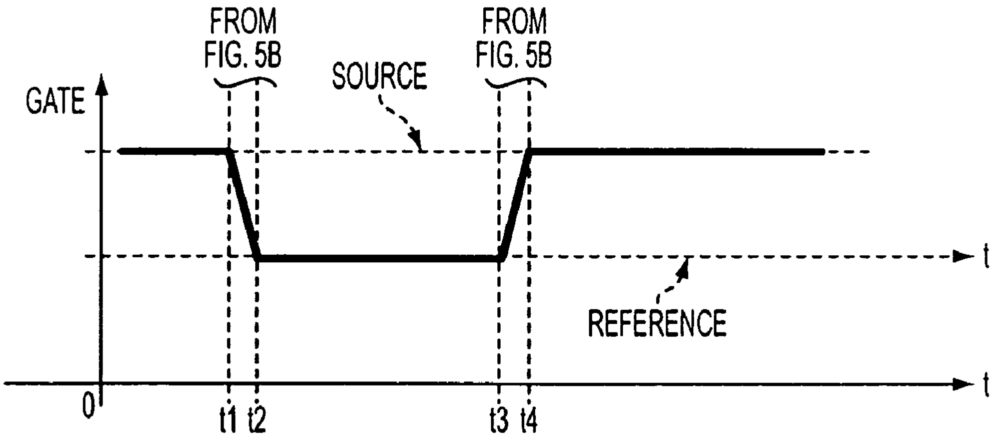

Please replace Fig. 5B with the attached replacement sheet. Voltage on line 73 has been added to the figure.

Please replace Fig. 6 with the attached replacement sheet. A connecting line 62 has been added to the figure.

In the Specification

Column 2, line 34 should read:
"lish, as magnitudes of $V_{IN}$ and $V_{OUT}$ with respect to ground".

Column 4, line 55 should read:
"this time, as the voltage level on line 73, Fig. 5b, is low, line 73 does not".

Column 4, line 59 should read:
"to ground (if the positive input voltage of the comparator 72 is below".

Column 4, line 62 should read:
"If the reference voltage at the positive input of the comparator 72 is above ground, the".

Column 4, line 66 should read:
"floating, the voltage level of line 73, FIG. 5b, at the output of compara".

In the Claims

Column 7, line 55 should read:
"15. The circuit as recited in claim 14, wherein the feedback".

Signed and Sealed this
Thirteenth Day of January, 2015

Michelle K. Lee

Michelle K. Lee
*Deputy Director of the United States Patent and Trademark Office*